(12) United States Patent
Furukawa

(10) Patent No.: US 8,194,134 B2
(45) Date of Patent: Jun. 5, 2012

(54) TARGET MOVING OBJECT TRACKING DEVICE

(75) Inventor: Satoshi Furukawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 1313 days.

(21) Appl. No.: 11/896,345

(22) Filed: Aug. 31, 2007

(65) Prior Publication Data

US 2008/0100709 A1     May 1, 2008

(30) Foreign Application Priority Data

Oct. 27, 2006  (JP) ................................ 2006-293078
Oct. 27, 2006  (JP) ................................ 2006-293079
Apr. 19, 2007  (JP) ................................ 2007-110915

(51) Int. Cl.
    *H04N 5/225* (2006.01)
(52) U.S. Cl. .................. 348/169; 348/152; 348/155
(58) Field of Classification Search .................. 348/169, 348/152, 155
    See application file for complete search history.

(56) References Cited

U.S. PATENT DOCUMENTS

| | | | |
|---|---|---|---|
| 5,280,530 A * | 1/1994 | Trew et al. ..................... | 382/103 |
| 5,285,273 A * | 2/1994 | James et al. .................... | 348/169 |
| 5,554,983 A * | 9/1996 | Kitamura et al. ............. | 340/937 |
| 5,757,287 A | 5/1998 | Kitamura et al. | |
| 6,031,568 A | 2/2000 | Wakitani | |
| 6,445,832 B1 * | 9/2002 | Lee et al. ....................... | 382/266 |
| 6,807,304 B2 * | 10/2004 | Loce et al. ..................... | 382/209 |
| 6,870,945 B2 * | 3/2005 | Schoepflin et al. ........... | 382/103 |
| 6,999,601 B2 * | 2/2006 | Pavlovic et al. ............... | 382/103 |
| 7,113,616 B2 | 9/2006 | Ito et al. | |
| 7,599,512 B2 * | 10/2009 | Shimizu et al. ................ | 382/100 |
| 7,729,422 B2 * | 6/2010 | Wilensky .................. | 375/240.01 |
| 7,813,558 B2 * | 10/2010 | Hatabu ........................... | 382/209 |
| 7,825,954 B2 * | 11/2010 | Zhang et al. ................... | 348/169 |
| 2002/0126895 A1 | 9/2002 | Satoh | |
| 2002/0180870 A1 | 12/2002 | Chen | |
| 2003/0142209 A1 | 7/2003 | Yamazaki et al. | |
| 2005/0286769 A1 | 12/2005 | Satoh | |

FOREIGN PATENT DOCUMENTS

| | | |
|---|---|---|
| EP | 0 474 307 A2 | 3/1992 |
| EP | 0 474 307 A3 | 3/1992 |
| JP | 3-219384 A | 9/1991 |

(Continued)

OTHER PUBLICATIONS

Taiwanese Office Action for the Application No. 096130528 dated Oct. 27, 2010.

(Continued)

*Primary Examiner* — Kevin Bates
(74) *Attorney, Agent, or Firm* — Cheng Law Group, PLLC

(57) ABSTRACT

A target moving object tracking device takes a time series of picture images of a target moving object, and track a movement of the moving object in the picture images for displaying an enlarged view of the moving object. The device includes a template memory storing a template image which is compared with each one of time-series outline images given from the picture images to determine a partial area in match with the template image for each of the outline images and extract the partial areas as a moving object outline image. The template image is constantly updated by being replaced with a combination of the previous moving object outline images to accurately reflect the moving object.

18 Claims, 8 Drawing Sheets

FOREIGN PATENT DOCUMENTS

| | | |
|---|---|---|
| JP | 6-30417 A | 2/1994 |
| JP | 8-249467 A | 9/1996 |
| JP | 10-111946 A | 4/1998 |
| JP | 11-86004 A | 3/1999 |
| JP | 11-252587 A | 9/1999 |
| JP | 2002-259976 A | 9/2002 |
| JP | 2002-354248 A | 12/2002 |
| JP | 2003-111063 A | 4/2003 |
| JP | 2006-246014 A | 9/2006 |
| TW | 503650 | 9/2002 |

OTHER PUBLICATIONS

Zhou, Xuhui et al,, "A Master-Slave System to Acquire Biometric imagery of Humans at Distance", International Multimedia Conference—First ACM SIGMM International Workshop on Video Surveillance; Berkeley, California, 2003, pp. 113-120.

European Search Report for the Application No. EP 07 01 5988 dated Jan. 17, 2011.

Notification of Reasons for Refusal for the Application No. 2006-293078 from Japan Patent Office mailed Jan. 18, 2011.

Notification of Reasons for Refusal for Application No. 2007-110915 from Japan Patent Office mailed Jun. 28, 2011.

Haga Tetsuji et al., "Human Tracking Using Temporal Averaging Silhouette with an Active Camera", IEICE Transactions on Information and Systems, Pt.2 (Japanese Edition), 2005, pp. 291-301, vol. J88-D-II No. 2, Japan (with abstract).

* cited by examiner

FIG.6
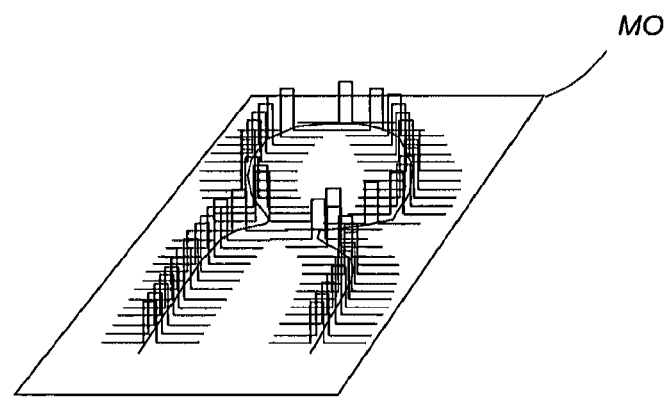
FIG.7
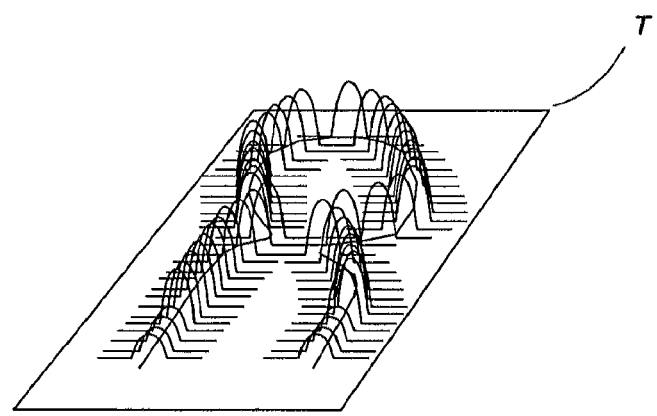
FIG.8A
| 0 | 0 | 0 |
|---|---|---|
| 0 | a | 0 |
| 0 | 0 | 0 |
FIG.8B
| a | 0 | 0 |
|---|---|---|
| 0 | a | 0 |
| 0 | 0 | 0 |
| 0 | a | 0 |
|---|---|---|
| 0 | a | 0 |
| 0 | 0 | 0 |
| 0 | 0 | 0 |
|---|---|---|
| 0 | a | 0 |
| 0 | 0 | a |
FIG.8C
| a | a | a |
|---|---|---|
| a | a | a |
| a | a | a |
| a | a | 0 |
|---|---|---|
| a | a | 0 |
| a | a | 0 |
| a | 0 | 0 |
|---|---|---|
| 0 | a | 0 |
| 0 | 0 | a |
| 0 | a | 0 |
|---|---|---|
| 0 | a | 0 |
| 0 | a | 0 |
| 0 | 0 | a |
|---|---|---|
| 0 | a | 0 |
| a | 0 | 0 |
| 0 | 0 | 0 |
|---|---|---|
| a | a | a |
| 0 | 0 | 0 |

PA

T

PA, P3

Tmax, T, T3

Py, PA, Px

Ty, T, Tx

TARGET MOVING OBJECT TRACKING DEVICE

TECHNICAL FIELD

The present invention is directed to a target moving object tracking device, and more particularly to such a device for tracking a possible intruder with a video camera.

BACKGROUND ART

There have been increased demands of tracking a human movement with a video camera in a restricted area around a gate or the like and identifying the human movement. For this purpose, a prior art tracking device is generally configured to determine a moving object area within each of monitored images by differentiation of the time series monitored images, and to enlarge thus determined moving object area. However, thus determined moving object area becomes smaller as the moving object moves faster, which renders the enlarged image of the moving object area only at a poor resolution. In order to settle this problem, another scheme of determining the moving object area is proposed in a paper "Human Tracking Using Temporal Averaging Silhouette with an Active Camera", vol. J88-D-II, No. 2, pp 291-301 of the Transactions of the Institute of Electronics, Information and Communication Engineers ISSN:09151923, published on 2005 May 1. The paper proposes to determine the moving object area based upon motion vectors (optical flows) obtained for selected points in each of the consecutive monitored images. Initially, the scheme obtains a detection frame which is detected by background differentiation to surround the moving object detected by the image differentiation. Then, the scheme goes to obtain the motion vectors with respect to areas selected respectively inside and outside of the detection frame for each of the two consecutive images, discriminates the moving object area from the background based upon the analysis of the motion vectors, and extracts a silhouette of the moving object in the current image to determine a shape and a center of the moving object. Although this scheme is found effective in a circumstance where only one moving object is expected, it is rather difficult to identify the moving object where more than one moving object is expected in a field of view of the camera. In order to alleviate this disadvantage, it may be thought effective to rely upon a template by which a target moving object could be discriminated from the other moving object. Since the silhouette of the moving object is defined as a collection of parts having the same motion vectors, a precise shape of the moving object is rather difficult to be extracted. Consequently, the above scheme is not satisfactory to realize a reliable determination of the moving object even with the addition of the template.

DISCLOSURE OF THE INVENTION

In view of the above problems, the present invention has been accomplished to provide a target moving object tracking device which is capable of determining the target moving object with an improved accuracy for identification of the target moving object.

The device in accordance with the present invention includes a picture image memory (20) configured to store a time series of real picture images taken by a video camera (10) with regard to an inspection zone covering a possible target moving object, and a display (30) configured to display selective one or ones of the real picture images at a desired magnification. Also included in the device are an outline image processor (40) configured to provide outline images respectively from the real picture images, and a template memory (60) configured to store a template image identifying the target moving object. The device further includes a moving object locator (70) configured to compare each one of the outline images with the template image to detect a partial area of each outline image that matches with the template image, and to obtain positional data of the target moving object within the inspection zone based upon the partial area detected to be in match with the template image. Enlarged picture generation means (80) is included in the device to extract, based upon the positional data, an enlarged view from a portion of the real picture image corresponding to the partial area of the outline image detected to match with the template image, and to display the enlarged picture view on the display. The feature of the present invention resides in that the moving object locator (70) is configured to extract a moving object outline image from each of the outline images in correspondence to the partial area detected to be in match with the template image, and that template updating means (62) is provided to update the template image by replacing it with a combination of the current one of the moving object outline image with previous one or ones of the moving object outline images. With this configuration, the template image is constantly updated in well reflection of the current and previous outline images once detected to match with the template image. Accordingly, the template image can accumulate and weight on the outline of a portion of the human body such as a head or shoulders of rather rigid shape, i.e., less susceptible to shape fluctuation during the movement of the human body than the other portion such as arms or legs, so as to give a solid basis for reliable identification of the moving object. In addition, any minor omission of a portion of the moving object in one of the moving object outline images can be complemented by another of the moving object outline images to make the template image as close as the target moving object, which results in an accurate determination of the target moving object based upon the comparison between the outline images and the template image.

Preferably, the outline image processor is configured to provide the outline image defined by binary data so as to implement the device with a reduced memory requirement for storing the outline image.

Alternatively, the outline image processor may be configured to provide the outline image defined by discrete gray scale data so as to enable more accurate comparison with the template image and provide more accurate template image, when the device is implemented with sufficient memory.

In this connection, the outline image processor may be configured to obtain a contrast of the template image so as to provide the outline image defined by binary data when the contrast exceeds a predetermined reference, and provide the outline image defined by gray scale data when the contrast is lower than the reference. Thus, the device can operate optimally depending upon the contrast of the constantly updating template image for consistent detection of the target moving object.

For determination of the contrast of the template image, the outline image processor is preferred to detect an average pixel value which is an average of pixel values given respectively to pixels within each of a plurality of divisions of the template image, and to judge that the contrast is below the reference when any one of the divisions is detected to have the average pixel value lower than a threshold or when the average pixel value detected for any one of the divisions is lower than that for another of the divisions by more than a predetermined extent.

When providing the outline image of the binary data, the outline image processor is preferred to provide a variable threshold for converting the real picture image into the outline image of the binary data, and to obtain an average gray scale value of the template image so as to lower the threshold as the average gray scale value is lower than a predetermined limit. Thus, it is possible to provide the outline image for successfully detection of the moving object even when the template image has a lowered contrast.

Preferably, a moving object outline image memory is provided to store a time series of the moving object outline images. In this connection, the template updating means is configured to read from the moving object outline image memory a predetermined number of the previous moving object outline images, combine these outline images with the current moving object outline image, and update the previous template image by replacing it with the combination. With this selective combination of the outline images, the template image can be suitably weighted for successful detection of the target moving object.

One preferred weighting scheme is realized in the template updating means which updates the template image each time a fresh consecutive set of the moving object outline images are accumulated up to the predetermined number.

Another weighting scheme may be made at the template updating means which combines only the moving object outline image that is determined to be valid in accordance with a predetermined criterion, thereby enabling the moving object detection with an improved accuracy.

For this purpose, the template updating means is configured to calculate a pixel index which is a number of pixels that are included in each of the moving object outline images and have a pixel value of more than zero. The above criterion is defined to determine the current moving object outline image as valid when the pixel index of the current moving object outline image varies from that of the previous moving object outline image by more than a predetermined extent.

Alternatively, the above criterion can be defined differently. In this case, the template updating means is configured to calculate a standard deviation of the pixel value of one of the current moving object outline image and the corresponding real picture image. The criterion is defined to determine the current moving object outline image as valid when the standard deviation varies by more than a predetermined extent from the standard deviation calculated with regard to the previous moving outline object image.

Further, the above criterion may be defined in terms of the number of pixels constituting an outline of the moving object in each of the moving object outline images. In this case, the template updating means is configured to calculate the number of pixels, and give the above criteria which determines the current moving object outline image as valid when the number of the pixels with regard to the current moving object outline image varies by more than a predetermined extent from the number of the pixels with regard to the previous moving object outline image.

The present invention also proposes the use of matching means (71) for successful determination of the target moving object with reference to the template image. The matching means (71) is configured to collect different partial areas, i.e., unit areas out of the outline image, each unit area being of the same size of the template image, to calculate a correlation with regard to each of the different areas, and to determine the partial area having a maximum correlation as the moving object outline image in match with the template image. In response to the determination of the moving outline image, the template updating means operates to obtain a pixel value for each of pixels in the moving object outline image so as to add the pixel value to each corresponding one of the pixels in the previous moving object outline image, thereby providing the updated template image.

The matching means (71) is configured to provide the above correlation which may be defined differently. For instance, the correlation may be defined as a sum or a power sum of pixel values obtained from the template image with regard to pixels selected to correspond to the pixels constituting an outline within each of the partial areas of the outline image.

Further, the correlation can be suitably weighted for determination of the target moving object with an improved accuracy. In this instance, the outline image processor is configured to give the outline image of binary data in which the pixel value of "1" is assigned to the pixels constituting an outline of the outline image and the pixel value of "0" is assigned to the remainder pixels of the outline image. The matching means (71) is configured to select the pixels from the template image corresponding to the pixels constituting the outline within each of the partial areas of the outline image, and obtain a number of the pixels having a pixel value of greater than "0" around each of the selected pixels so as to weight the pixel vale for each of the selected pixels in accordance with thus obtained number of the pixels. The matching means (71) is further configured to define the correlation as the sum of thus weighted pixel values of the selected pixels of the template image.

The correlation can be weighted differently. For instance, the matching means (71) is configured to obtain a first number of the pixels for each of the partial areas satisfying that both of the pixels in the partial area and the corresponding pixels in the template image have the pixel value of "1" or greater, and a second number of the pixels in the template image having the pixel value of "1" or greater. Then, the matching means (71) defines the above correlation for each of the partial areas that is a ratio of the first number to the second number.

The matching means (71) may be configured to obtain a first number of the pixels for each of the partial areas satisfying that both of the pixels in the partial area and the corresponding pixels in the template image have the pixel value of "1" or greater, a second number of the pixels for each of the partial areas satisfying that both of the pixels in the partial area and the corresponding pixels in the template image have the pixel value of "0", and a third number of the pixels in the template image having the pixel value of "1" or greater. In this instance, the correlation is defined for each of the partial areas as a ratio of the first number plus the second number to the third number.

Further, the matching means (71) may be configured to obtain a maximum of the pixel values from a set of pixels arranged around a selected pixel in the template image which corresponds to each of pixels constituting an outline within each of the partial areas of the outline image. In this instance, the correlation is defined at the matching means (71) as a sum of the maximum values obtained respectively for the partial areas.

Still further, the matching means (71) may be configured to obtain various parameters for defining the correlation on the basis of such parameters. The parameters include a first row index which is the number of the pixels arranged in each row of each the partial area of the outline image and having the pixel value of more than "0", a first column index which is the number of the pixels arranged in each column of each the partial area of the outline image and having the pixel value of more than "0", a second row index which is the number of the pixels arranged in each row of the template image and having the pixel value of more than "0", and a second column index which is the number of the pixels arranged in each column of the template image and having the pixel value of more than "0". Further, a row number difference is obtained as a difference between the first row index and the second row index, while a column number difference is obtained as a difference between the first column index and the second column index. Then, the matching means (71) obtains a total row value which is a sum of the row number differences obtained respectively with respect to the rows, and a total column value which is a sum of the column number differences obtained respectively with respect to the columns so as to define the correlation as an inverse of the total row value and the total column values for each of said partial areas.

The present invention further proposes to delimit the outline image to a limited search region for detection of the target moving object with a reduced detection time. For this purpose, the device includes position estimating means for estimating a limited search region within the outline image for detection of the target moving object. In this connection, the moving object extracting means is configured to detect at least one possible moving object based upon a time-dependent difference between two or more of the consecutive outline images and provide at least one mask section of reduced size covering the moving object. The position estimating means is configured to obtain a time series data of the positional data which is stored in a position data memory each time the moving object locator gives the positional information, to calculate an estimated position of the target moving object based upon two or more consecutive time series data of the positional information, to set a prospected zone of a predetermined size around the estimated position, and to provide the limited search region which is a minimum region including the at least one the mask section which overlaps the prospected zone. In this consequence, the moving object locator is configured to select the partial areas only within the limited search region, thereby reducing the time of determining the target moving object.

The position estimating means may be configured to calculate an estimated moving speed of the moving object based upon two or more consecutive time series data of the positional information, and to provide the prospected zone of which size is proportional to the estimated speed of the moving object.

The prospected zone may be determined at the position estimating means to have the size which is a function of the size of the template image.

In order to further delimit the limited search region, the position estimating means may be configured to obtain a row index which is the number of the pixels arranged along each row of the limited search region and having the pixel value of "1" or greater, select a set of consecutive rows each having the row index greater than a predetermined row threshold, obtain a column index which is the number of the pixels arranged along each column of the limited search region and having the pixel value of "1" or greater, select a set of consecutive columns each having the column index greater than a predetermined column threshold, and delimit the limited search region to a region confined by the selected group of the consecutive rows and the selected group of the consecutive columns.

In this connection, the position estimating mans may be configured to validate, when two or more groups of the consecutive rows are selected, only one of the groups which is closer to the estimated position of the target moving object, and to validate, when two or more groups of the consecutive columns are selected, only one of the groups which is closer to the estimated position of the target moving object.

Another delimitation of the limited search region is proposed in which the position estimating means may be configured to obtain a row index which is the number of the pixels arranged along each row of said limited search region and having the pixel value of "1" or greater, and select at least one group of consecutive rows each having the row index greater than a predetermined row threshold. When two or more groups of the consecutive rows are selected, it is made to validate only one group of the consecutive rows which is closer to said estimated position of the target moving object. Subsequently, a calculation is made only with respect to a range confined by the validated group of the consecutive rows to obtain a column index which is the number of the pixels arranged along each row of the limited search region and having the pixel value of "1" or greater. Then, it is made to select a group of consecutive columns each having the column index greater than a predetermined column threshold so that the position estimating means delimits the limited search region further to a region confined by the selected group of the consecutive columns and the validated group of the rows. This arrangement is advantageous in further reducing the number of the calculations for determination of the moving object.

Alternatively, the position estimating means is configured to first analyze the column index to validate one of the separate groups of the consecutive columns, and to select the group of the consecutive rows only with reference to the validated group of the columns for further restricting the limited search region.

These and still other advantageous features of the present invention will become more apparent from the following description of the preferred embodiments when taken in conjunction with the attached drawings.

BRIEF DESCRIPTION OF THE DRAWINGS

FIG. 6 is a schematic view illustrating a moving object outline image extracted from the outline image;

FIG. 7 is a schematic view illustrating the template image in comparison with the moving object outline image of FIG. 6;

FIGS. 8A to 8C are schematic views respectively explaining schemes of weighting the template image depending upon arrangements of pixel values;

BEST MODE FOR CARRYING OUT THE INVENTION

Figure 1:
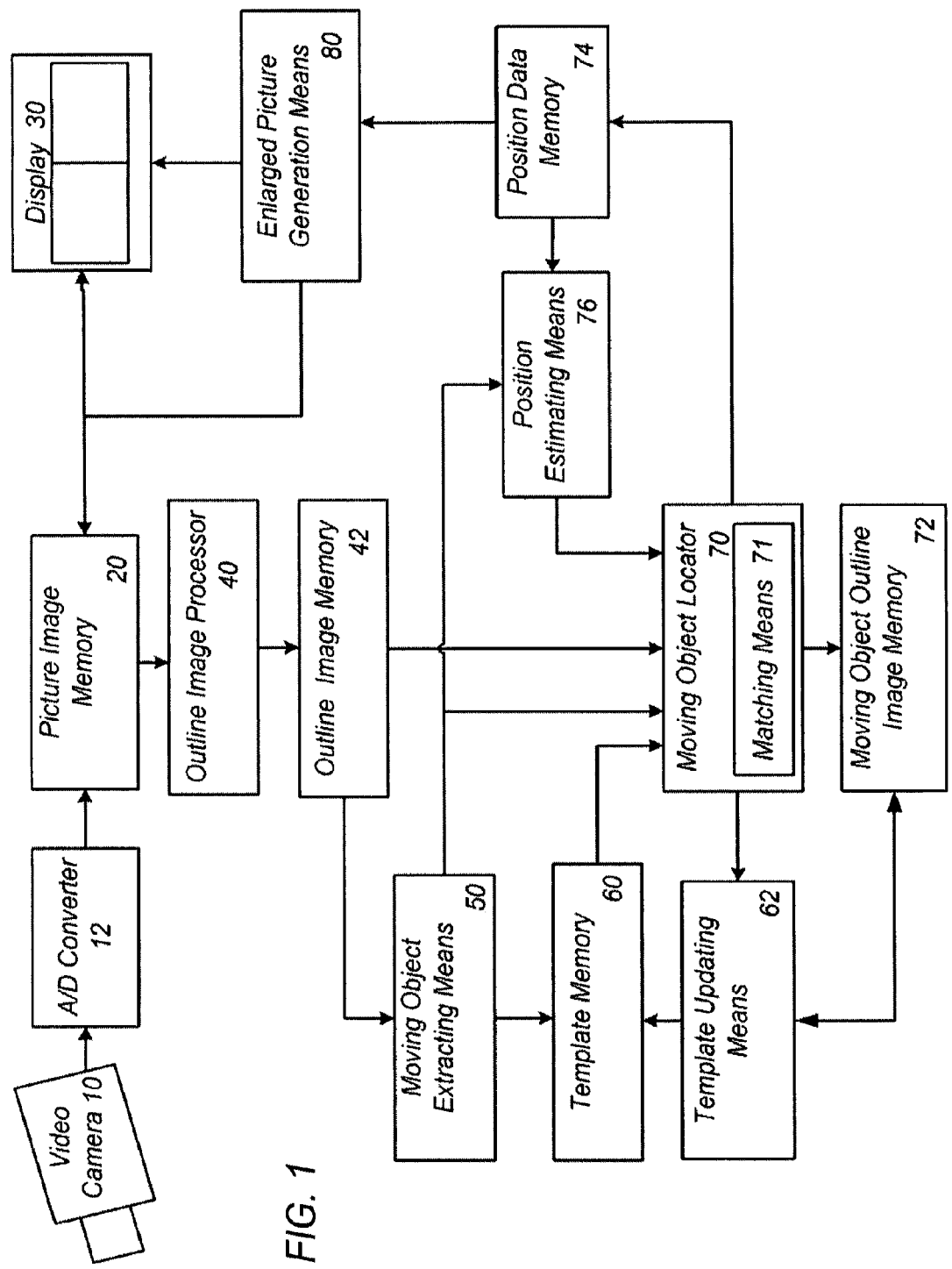
FIG. 1 is a block diagram of a target moving object tracking device in accordance with a preferred embodiment of the present invention.

Referring to FIG. 1, there is shown a target moving object tracking device in accordance with a preferred embodiment of the present invention. The device is utilized as an intruder monitor system to detect an intruder or target moving object, track its motion, and display the intruder with a magnified view for identifying the intruder.

Figure 2:
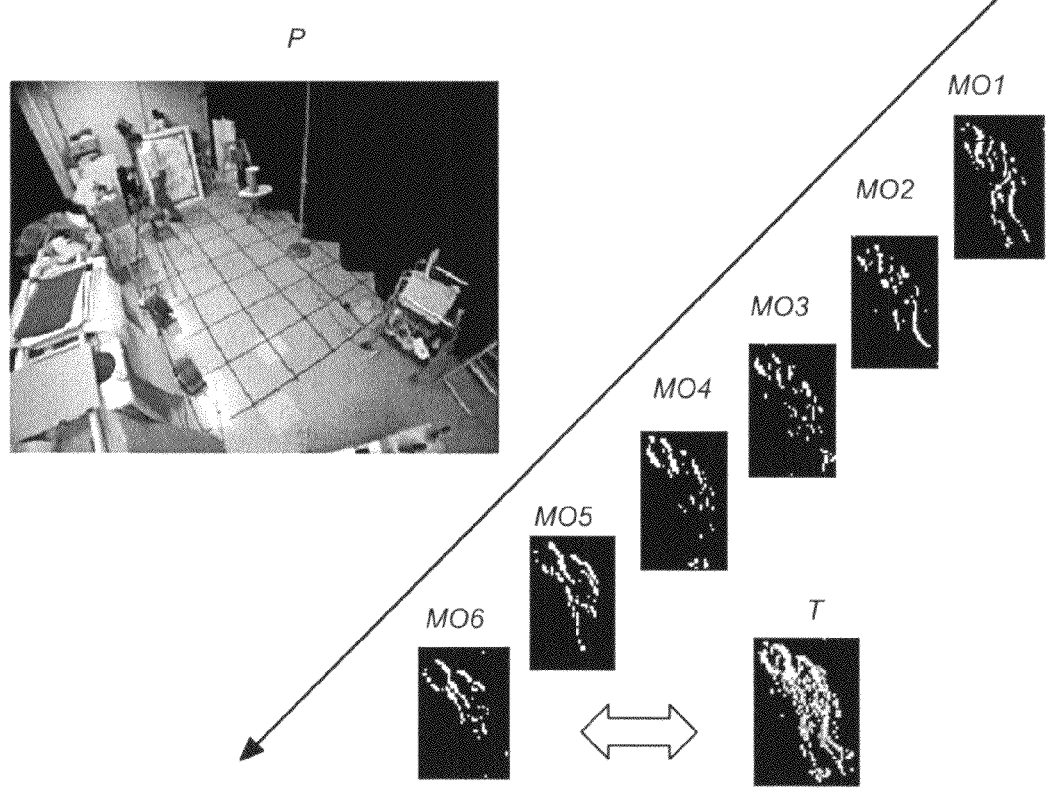
FIG. 2 is a schematic view illustrating how to track a moving object from consecutive outline images thereof with reference to a template image.
Figure 3:
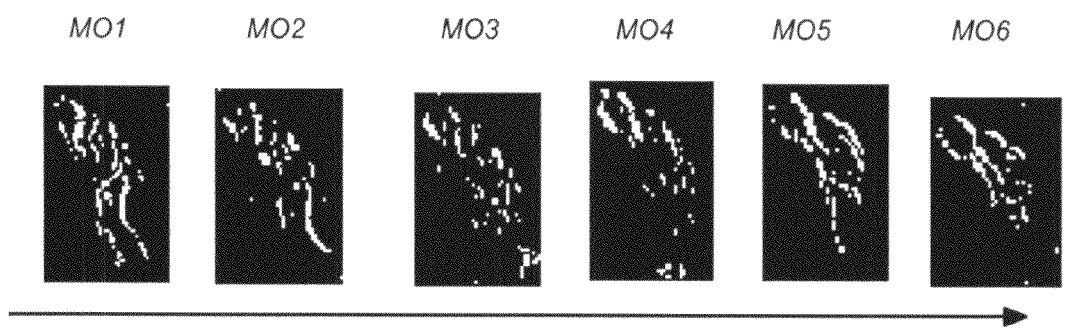
FIG. 3 illustrates a time series data of the outline images.
Figure 4:
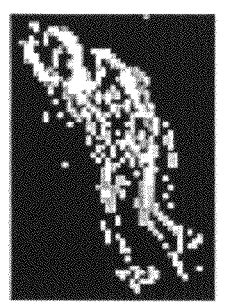
FIG. 4 illustrates the template image.

The device includes a camera 10 covering an inspection zone to take continuous pictures which are converted through an A/D converter 12 into a time series digital data of real picture images P which cover the entire field of view, as shown in FIG. 2, and are stored in a picture image memory 20. The device includes a display 30 capable of displaying a current picture image as well as an enlarged view of a selected portion of the current image for identification of the target moving object, as will be discussed later. An outline image processor 40 is included in the device to generate an outline image from each of the real picture images in the memory 20 and store a resulting time series data of the outline image in an outline image memory 42. The outline image is either in the form of binary image data or in the form of a gray scale data. A moving object extracting means 50 is provided to extract, for each of the outline images, a partial area, i.e., unit area surrounding the moving object, the details of which will be discussed later. Initially, the partial area is fed to and stored in a template memory 60 as a transient template image which is compared at a moving object locator 70 with a subsequent one of the outline images to locate the target moving object in a frame of that outline image. As will be discussed later, a template updating means 62 is included in the device to update the template image T regularly as replacing it with a combination of a selected number of the partial areas which are subsequently determined at the moving object locator 70 to include the target moving object. Such partial area of the outline image determined to include the target moving object is referred to hereinafter as a moving object outline image. For this purpose, a moving object outline image memory 72 is provided to store a time series data of the moving object outline images MO1 to MO6, which are illustrated for example in FIG. 2 in comparison with the real picture image P and the template image T, and also shown in FIG. 3. It is noted in this connection that the updated template image T is defined as a gray scale image having varying pixel values.

When the moving object extracting means 50 extracts two or more portions each including possible moving objects at a time of determining the initial template image, the moving object locator 70 is caused to compare each candidate one of the portions with a predetermined number of the successive outline images to determine an authentic one that appears continuously in these outline images such that the template updating means 62 designates such authentic portion as the initial template image.

The moving object locator 70 is configured to obtain positional data for the moving object located within the frame of each of the current outline images and transmit the positional data to a position data memory 74. The positional data is constantly read by an enlarged picture generation means 80 which responds to read a current picture image, select a portion therefrom, and generate an enlarged picture image of the portion at a predetermined magnification for displaying the enlarged picture image at the display 30, thereby notifying an administrator of the target moving object with the enlarged effect.

The device further includes position estimating means 76 which calculates an estimated position of the target moving object based upon two or more consecutive time series data of the positional data, and provides a limited search region within the outline image around the estimated position for detection of the target moving object, the details of which will be discussed later.

Figure 5:
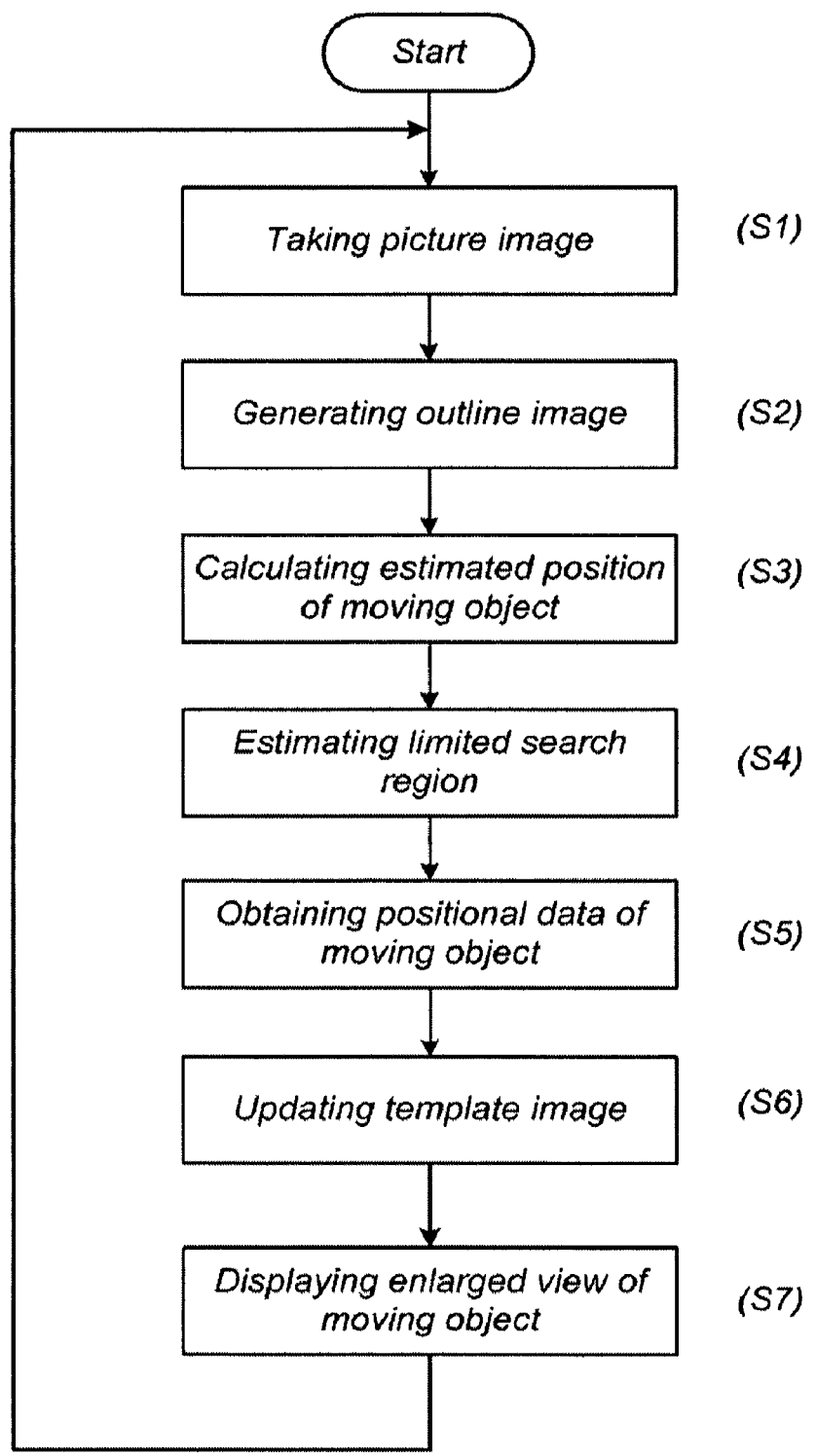
FIG. 5 is a flow chart illustrating a basic operation of the device.

In brief, the device repeats to execute a controlled loop which includes, as shown in FIG. 5, steps of taking the real picture image (S1), generating the outline image thereof (S2), calculating the estimated position of the moving object (S3), estimating the limited search region (S4), obtaining the positional data of the moving object (S5), updating the template image (S6), and displaying the enlarged view of the moving object (S7).

Now, the details of several parts of the device will be explained hereinafter. The outline image processor 40 is configured to obtain a contrast of the template image T once after the template image is updated, and to provide the outline image defined by a binary data when the contrast exceeds a predetermined reference, and otherwise provide the outline image defined by gray scale. In determining the kind of the outline image, the outline image processor 40 detects an average pixel value which is an average of pixel values given respectively to pixels within each of a plurality of predetermined divisions of the template image, and judges that the contrast is below the reference when any one of the divisions is detected to have the average pixel value lower than a threshold or when the average pixel value detected for any one of the divisions is lower than that for another of the divisions by more than a predetermined extent. When making the outline image of the binary data, the outline image processor 40 is configured to rely upon a variable threshold for converting the real picture image into the binary data image, and to obtain an average gray scale value of the template image so as to lower the threshold as the average gray scale value is lower than a predetermined limit for successful comparison with the template image at the moving object locator 70. The outline image of the binary data is also called as an edge image which is obtained by use of a well-known Sobel filter or the corresponding technique.

The moving object extracting means 50 is now explained in terms of its function of extracting the moving outline image. The moving outline image is obtained for each of the outline image extracted at time (T) with reference to two previous outline images extracted respectively at times (T−ΔT2) and (T−ΔT1) and two subsequent outline images extracted respectively at times (T+ΔT1) and (T+ΔT2). The outline images extracted respectively at times (T−ΔT2) and (T+ΔT2) are ANDed to give a first logical product image PT1, while the outline images extracted respectively at times (T−ΔT1) and (T+ΔT1) are ANDed to give a second logical product image PT2. The first logical product image PT1 is inverted and followed by being ANDed with the outline image extracted at time T to give a third logical product image PT3 which includes an outline of the moving object appearing in the outline image at T, a background outline being concealed behind the moving object at time (T−ΔT2) but appearing at time (T), and a background outline appearing at time (T−ΔT2) but being concealed behind the moving object at time (T+ΔT2). Likewise, the second logical product image PT2 is inverted followed by being ANDed to give a fourth logical product image (PT4) which includes the outline of the moving object appearing in the outline image at T, a background outline being concealed behind the moving object at time (T−ΔT1) but appearing at time (T), and a background outline appearing at time (T−ΔT1) but being concealed behind the moving object at time (T+ΔT1). Finally, the third and fourth logical product images are ANDed to extract the outline of the moving object. The moving object extracting means having the above function is already known in the art, for example, as disclosed in Japanese Patent Publication No. 2004-265252, therefore no further detailed explanation is deemed necessary. In this connection, the present invention may utilize a like moving object extracting means of different configurations. The updating of the template image T is now explained. The template updating means 62 is configured to read a predetermined number of the previous moving object outline images from the moving object outline image memory 72, and combine these images with the current moving outline object image determined at the moving object locator 70 to be in match with the template image, thereby updating the previous template image T by replacing it with thus combined images. As schematically shown in FIG. 7, thus template image T gives higher pixel values to an outline of a specific portion of the human body such as a head or shoulders which is rather rigid, i.e., less susceptible to shape fluctuation during the motion than other portions such as arms or legs. With this result, the template image T becomes well indicative of a principal portion of the moving object so as to give a solid basis for reliable determination of the moving object in comparison with the current moving outline object image in terms of a correlation between the template image and the moving outline image, as will be discussed later. Further, thus updated template image T can well compensate for any minor omission of a portion of the moving object in one of the moving object outline images by a corresponding portion in one or ones of the other moving object outline images. For example, a portion of the abdomen concealed behind fast waving hands in one moving object image can be supplemented with the corresponding portion appearing in the other moving object image, thereby making the template image as close as the target moving object, which results in an accurate determination of the target moving object based upon the comparison between the outline images and the template image.

Preferably, the updating is made each time a fresh consecutive set of the moving object outline images are accumulated up to the predetermined number. Further, the template updating means 62 is configured to combine only the moving object outline image which is determined to be valid in accordance with a predetermined criterion. One example of the criterion is based upon a pixel index which is a calculated number of pixels that are included in each of the moving object outline images and have a pixel value of more than zero. The criterion is defined to determine the current moving object outline image as valid when the pixel index thereof varies from that of the previous moving object outline image by more than a predetermined extent. Another criterion is based upon a standard deviation of the pixel value of one of the current moving object outline image and the corresponding real picture image, and is defined to determine the current moving object outline image as valid when the standard deviation varies by more than a predetermined extent from the standard deviation calculated with regard to the previous moving outline object image. Further, the criterion may be based upon a calculated number of pixels which constitute the outline of the moving object in each of the moving object outline images, and is defined to determine the current moving object outline image as valid when the number of the pixels with regard to the current moving object outline image varies by more than a predetermined extent from the number of the pixels with regard to the previous moving object outline image.

The template updating means 62 may be configured to weigh the current moving outline image in relation to a combined set of the previous moving outline images using the following weighting equation.

$$T(x,y)=K \cdot Vn(x,y)+(1-K) \cdot Vp(x,y)$$

in which T(x,y) represents pixel value in each pixel of the template image, Vn(x,y) represents pixel value in each pixel of the current moving object outline image, Vp(x,y) represent pixel value in each pixel of the combined set of the previous moving object outline images, and K is weighting coefficient.

Thus, by suitable selecting the weighting coefficient K, the template image T can be made to reflect the current moving object outline image stronger or weaker in relation to the combined set of the previous moving object outline images.

The moving object locator 70 includes matching means 71 which is configured to collect different partial areas out of each current one of the outline images, each partial areas being of the same size of the template image, and to calculate a correlation with regard to each of the different partial areas in relation to the template image T. The matching means 71 operate to scan the whole area of the outline image continuously by selecting the different partial areas, i.e. by shifting the partial area by one pixel in the row or column direction, so as to determine the partial area having a maximum correlation as the moving object outline image that matches with the template image T. When the moving object outline image MO of the binary data, as schematically shown in FIG. 6, is determined as being in match with the current template image T, the template updating means 62 responds to obtain a pixel value for each of pixels in the matched moving object outline image MO so as to add the pixel value to each corresponding one of the pixels in the previous moving object outline image, thereby providing the updated template image T which, as schematically shown in FIG. 7, has the pixels having pixel values of correspondingly accumulated gray scale data.

In the present invention, the correlation is suitably selected from various definitions as explained below. One example is to define the correlation as a sum of the pixel values obtained from the template image T with regard to the pixels selected to correspond to the pixels constituting the outline of the moving object within each of the partial areas of the outline images. Another example is to define the correlation as a power sum of the pixel values obtained from the template image T with regard to the pixels corresponding to the pixels constituting the outline of the moving object within each of the partial areas of the outline image. The power sum is preferred to be a sum of the squares of the pixel values.

Further, the correlation may be weighted when the outline image processor 40 gives the outline image of the binary data in which the pixel value of "1" is assigned to the pixels constituting the outline of the outline image, and the pixel value of "0" is assigned to the remainder pixels of the outline image. In this instance, the matching means 71 is configured to select the pixels from the template image T corresponding to the pixels constituting the outline within each of the partial areas of the outline image, and obtain a number of the pixels having a pixel value of greater than "0" around each of the selected pixels so as to weight the pixel value for each of the selected pixels in accordance with thus obtained number of the pixels. For example, when all of the eight (8) surrounding pixels around a center pixel have the pixel value of "0", as shown in FIG. 8A, the center pixel is given a small weight of "1". When a selected one of the eight surrounding pixels has the pixel value of greater than "0", as shown in FIG. 8B, the center pixel is given a larger weight of "2". When more than one of the eight surrounding pixels has the pixel value of greater than "0", as shown in FIG. 8C, the center pixel is give a much larger weight of "4". The pixel value of "a" at each pixel is multiplied by thus determined weight so that the matching means 71 define the correlation as the sum of the weighted pixel values of the selected pixels in the template image T for consistent matching of the outline image with the template image T. The value of the weight may be suitably selected from other than the above values "1", "2", and "4"

The correlation may be defined differently in term of a ratio of a first number of specific pixels to a second number of specific pixels. The first number is the number of the pixels counted in each of the partial areas to satisfy that both of the pixels in the partial area and the corresponding pixels in the template image have the pixel value of "1" or greater, while the second number is the number of the pixels counted in the template image to have the pixel value of "1" or greater. Thus defined correlation is especially advantageous to accurately compare the outline image with the template image when these images have the number of the pixels of "0" in a greater proportion than the number of the pixels of "1" or greater, as exemplarily shown in FIG. 9A for the partial area PA of the outline image and FIG. 9B for the template image T, in which a black square indicates the pixel of "0", and a white square indicates the pixel value of "1" or greater. In the illustrated instance, the correlation is expressed as the ration of 11/14 (=79%) where the first number is "11" and the second number is "14". The correlation is obtained for each of the partial areas PA in the outline image to determine the partial area or the moving object outline image showing a maximum correlation. With the use of thus defined correlation, an accurate detection of the moving object can be made relatively free from being influenced by the pixels of "0" not constituting the outline of the moving object.

Alternatively, the correlation may be defined also in consideration of the number of the pixels having the pixel value of "0" in both of the partial area PA and the template image T. In this instance, the matching means 71 is configured to obtain 1) a first number of the pixels counted for each of the partial areas to satisfy that both of the pixels in the partial area and the corresponding pixels in the template image have the pixel value of "1" or greater, 2) a second number of the pixels counted in each of the partial areas to satisfy that both of the pixels in the partial area and the corresponding pixels in the template image have the pixel value of "0", and 3) a third number of the pixels counted in the template image to have the pixel value of "1" or greater.

Figure 9A:
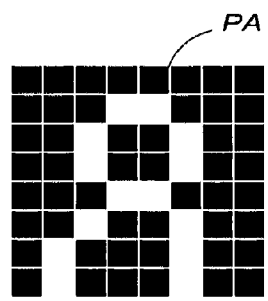
FIGS. 9A and 9B are schematic views respectively illustrating a portion of the partial area of the outline image and a corresponding portion of the template image.
Figure 9B:
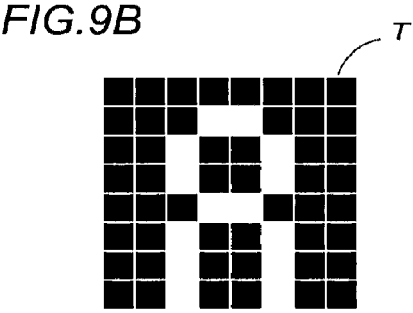

The matching means 71 defines the correlation for each of the partial areas that is a ratio of the first number plus the second number to the third number. When applying thus defined correlation to the illustrated example of FIGS. 9A and 9B, the correlation for the partial area of FIG. 9A is 4.1 {=(11+47)/14}.

Figure 10A:
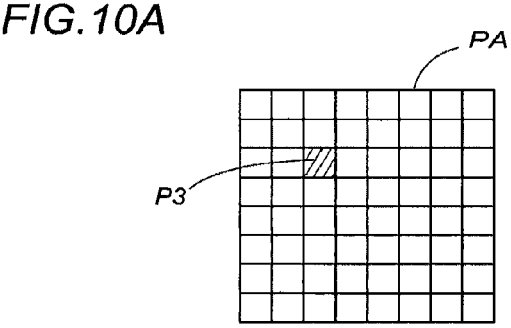
FIGS. 10A and 10B are schematic views respectively illustrating a portion of the partial area of the outline image and a corresponding portion of the template image.
Figure 10B:
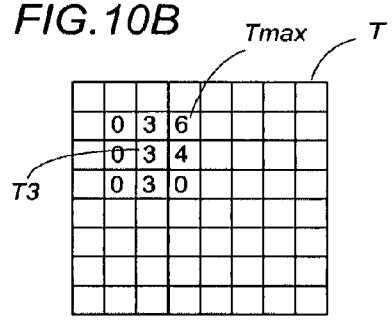

Further, the matching means 71 may rely upon the correlation defined in consideration of the surrounding pixels around each of specific pixels in the template image. The matching means 71 is configured to select a group of outline pixels that constitute the outline in each of the partial areas, obtain a maximum of the pixel values from a set of pixels arranged around a specific pixel in the template image which corresponds to each of the outline pixels, and to define the correlation as a sum of the maximum values obtained respectively for the partial areas. That is, as shown in FIGS. 10A and 10B, each one (P3) of the outline pixels in the partial area PA is evaluated in terms of the surrounding pixels about the specific pixel (T3) in the template image T, i.e., the pixel (Tmax) having the maximum value of "6". In this manner, the each partial area is given the correlation which is the sum of thus obtained maximum values each obtained for the outline pixels in the partial area such that the matching means 71 determines the partial area having a maximum correlation as the moving object outline image.

Figure 11:
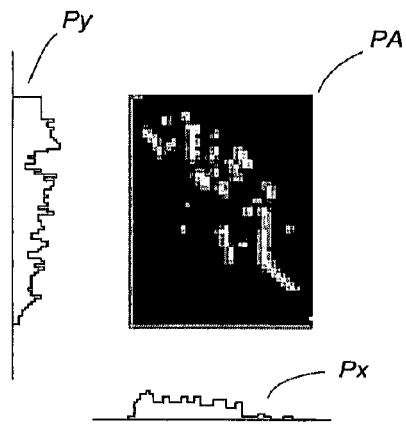
FIG. 11 is a graphical representation illustrating distribution of pixel values calculated for a partial area of the outline image for comparison with the template image in terms of a correlation between the distributions of the pixel values.
Figure 12:
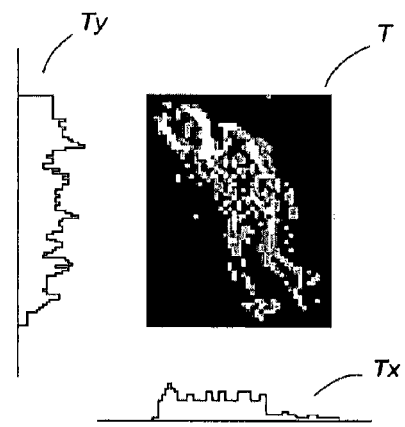
FIG. 12 is a graphical representation illustrating distribution of pixel values calculated for the template image.

Still further, the matching means 71 may rely upon the correlation defined in consideration of histograms (Py, Px; Ty, Tx) obtained respectively for each of the partial areas PA and the template image T, as shown in FIGS. 11 and 12. Two histograms (Py, Px) are obtained for each of the partial areas PA, one along Y-axis and the other along X-axis. Likewise, two histograms (Tx, Ty) are obtained for the template image T respectively along Y-axis and X-axis. The Y-axis histogram (Py) is a distribution of a first row index which is the number of the pixels arranged in each row of the partial area PA of the outline image and having the pixel value of more than "0", while the X-axis histogram (Px) is a distribution of a first column index which is the number of the pixels arranged in each common of the partial area PA of the outline image and having the pixel value of more than "0". The Y-axis histogram (Ty) is a distribution of a second row index which is the number of the pixels arranged in each row of the template image T and having the pixel value of more than "0", while the X-axis histogram (Tx) is a distribution of a second column index which is the number of the pixels arranged in each column of the template image T and having the pixel value of more than "0". Based upon these histograms, the matching means 71 calculates a row number difference which is a difference between the first row index and the second row index, a column number difference which is a difference between the first column index and the second column index, a total row value which is a sum of the row differences obtained respectively with respect to the rows, and a total column value which is a sum of the column differences obtained respectively with respect to the columns. Then, the matching means 71 defines the correlation as an inverse of a sum of the total row value and the total column values for each of the partial areas. Thus, the correlation becomes greater as the total row value and the total column value becomes smaller, i.e., a specific one of the partial areas becomes closer to the template image. With the use of thus defined correlation, the calculation of the pixel values can be greatly reduced while scanning the whole area of the outline image with the partial area being shifted by one pixel along the row or the column. For example, when the partial area is shifted by one pixel along the row, the first column sum is only required for one new column not covered by the previous partial areas, and the first column sum for the remaining columns are already available in the previous step. This applies also when the partial area is shifted by one pixel along the column, in which case the first row sum is only required for one new row.

Figure 13:
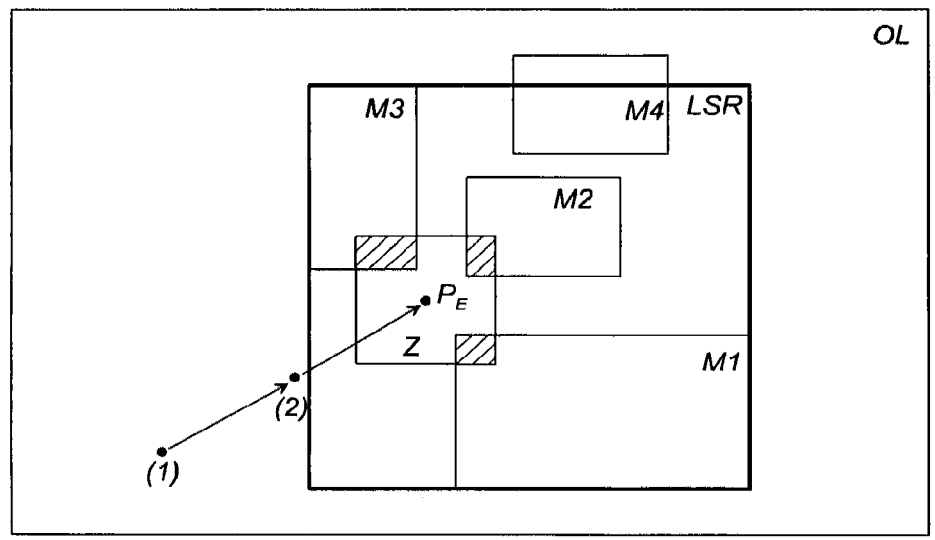
FIGS. 13 to 15 illustrate individual schemes of providing a limited search region within the outline image.

In the present invention, the scanning of the outline image is made to the limited search region based upon the detected motion of the moving object in order to improve the speed of detecting the moving object. For this purpose, the position estimating means 76 provides the limited search region within the outline image in association with the moving object extracting means 50 which provides at least one mask section or the partial section of a reduced size covering the moving object. FIG. 13 illustrates one example in which four (4) mask section M1, M2, M3, and M4 are provided within the outline image OL by the moving object extracting means 50. The position estimating means 76 is configured to obtain a time series data of the positional data each time the moving object locator 70 gives the positional data, and to calculate an estimated position $P_E$ of the target moving object based upon two or more consecutive time series data of the positional data. Then, the position estimating means 76 sets a prospected zone Z of a predetermined size around the estimated position $P_E$, and determines the limited search region LSR which is a minimum region including the mask sections M1, M2, and M3 which overlaps the prospected zone Z, and excluding the mask section M4 not overlapped with the prospected zone Z. After determining the limited search region LSR, the position estimating means 76 gives an instruction to the moving object locator 70 to select the partial areas only within the limited search region LSR.

In this instance, the prospective zone Z may have a size which varies in proportion to a speed of the moving object moving from the previously located point (1) to point (2). The prospective zone Z of non-square configuration may be also available in which the x-axis size and the y-axis size varies by different extents in proportion to the speed of the moving object.

Alternatively, the prospective zone Z may have a size which is a function of the size of the template image. For example, the zone Z is defined to have a size which greater than the size of the template image by a factor of more than 1. Also, the factor may be selected to vary in proportion to the detected speed of the moving object, and may be different for the x-axis and the y-axis.

Figure 14:
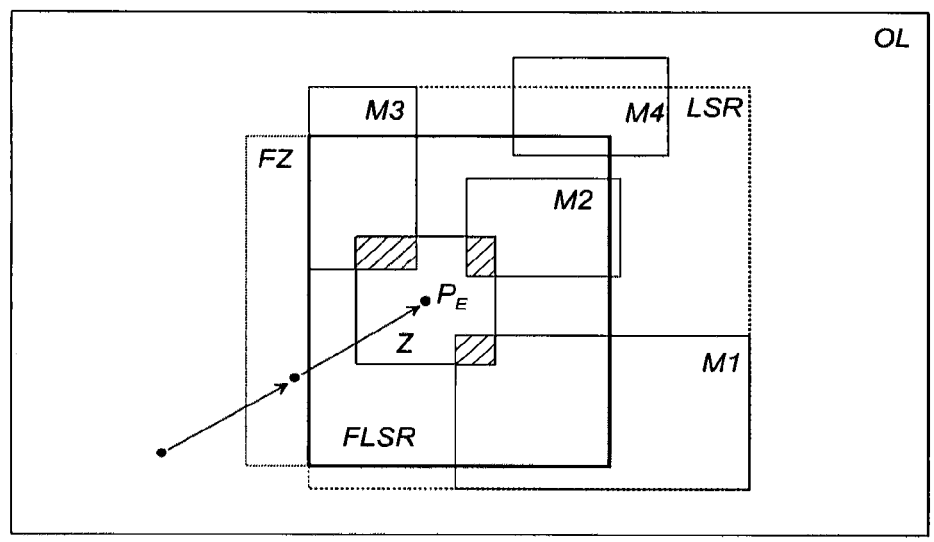

FIG. 14 illustrates another scheme of further restricting the limited search region LSR to FLSR with the use of a filter zone FZ which is formed around the estimated position $P_E$ to have a size which is a function of the speed of the moving object. Then, the limited search LSR is delimited further to a region FLSR common to the filter zone FZ.

Figure 15:
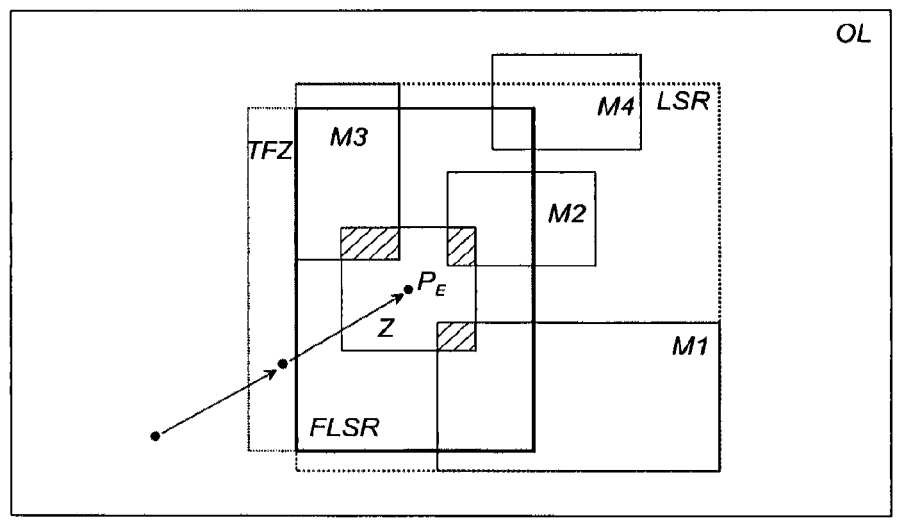

Alternatively, as shown in FIG. 15, the limited search region LSR may restricted to FLSR by use of a template filter zone TFZ which is formed around the estimated position $P_E$ to have a size which is a function of the size of the template image.

It is noted in this connection that the filer zone FZ or the template filter zone TFZ may be alone utilized as the limited search region.

Figure 16:
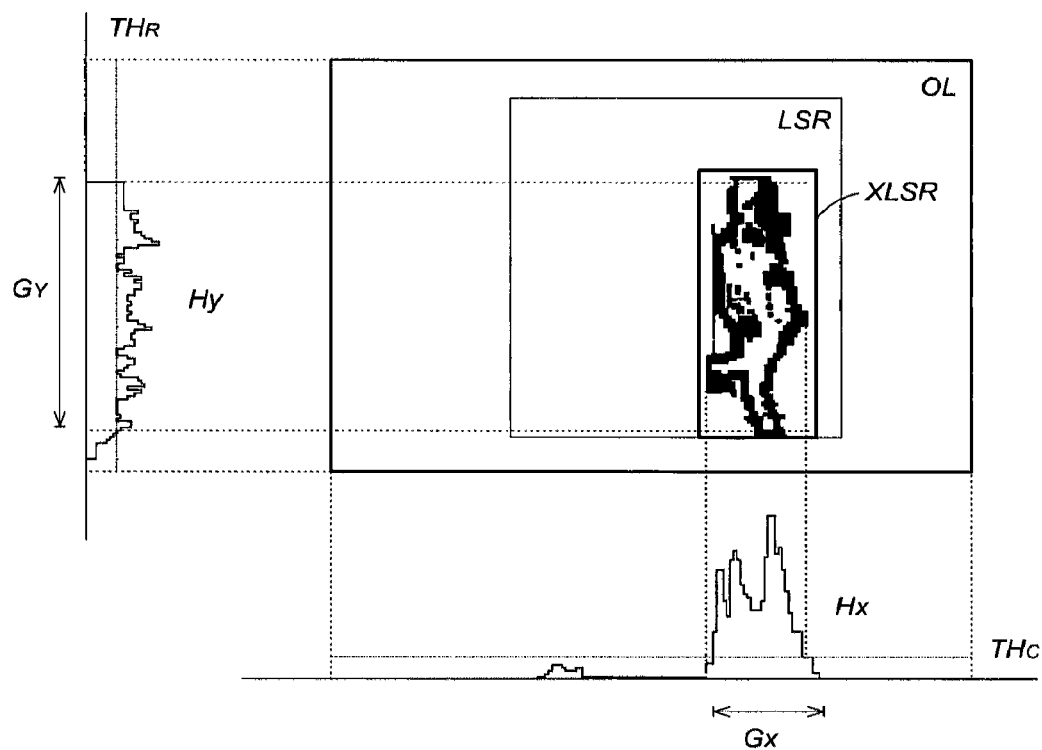
FIG. 16 is an explanatory view illustrating how to determine the moving object within the limited search regions.

Further, the limited search region LSR may be further restricted to XLSR in view of histograms (Hy, Hx) of the pixel values both along x-axis and y-axis, as shown in FIG. 16. The histogram (Hy) is an y-axis distribution of a row index which is the number of the pixels arranged along each row of the limited search region LSR and having the pixel value of "1" or greater. The limited search region LSR is obtained according the scheme in FIG. 13, or even the restricted limited search region FLSR according to the scheme depicted in FIG. 14 or FIG. 15. Also in this instance, the histogram (Hx) is a distribution of a column index which is the number of the pixels arranged along each column of the limited search region LSR and having the pixel value of "1" or greater. The position estimating means 76 analyzes the histograms (Hy, Hx) respectively in comparison with a predetermined row threshold $TH_R$ and a predetermined column threshold $TH_C$, so as to select a group $G_Y$ of consecutive rows each having the row index greater than the row threshold $TH_R$, and a group $G_X$ of consecutive columns each having the row index greater than the column threshold $TH_C$. Then, the position estimating means 76 restrict the limited search region LSR to a region XLSR confined by the selected groups $G_Y$ and $G_X$, while eliminating any possible noises for accurate detection of the target moving object.

Figure 17:
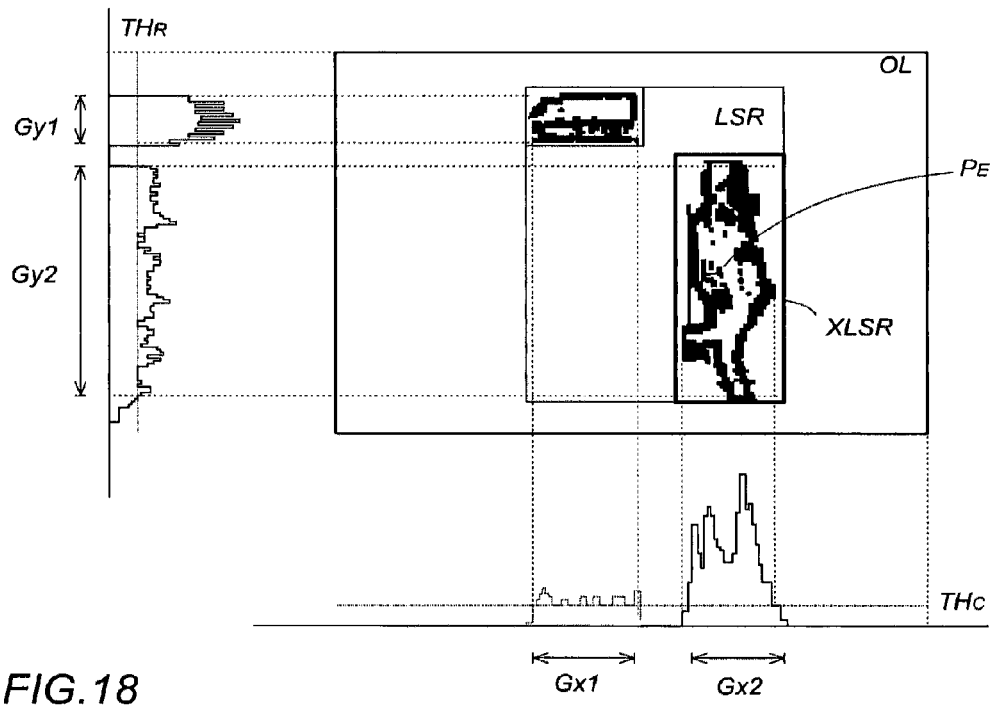
FIGS. 17 and 18 are explanatory views respectively illustrating how to further delimit the limited search regions in the presence of a plurality of moving objects.
Figure 18:
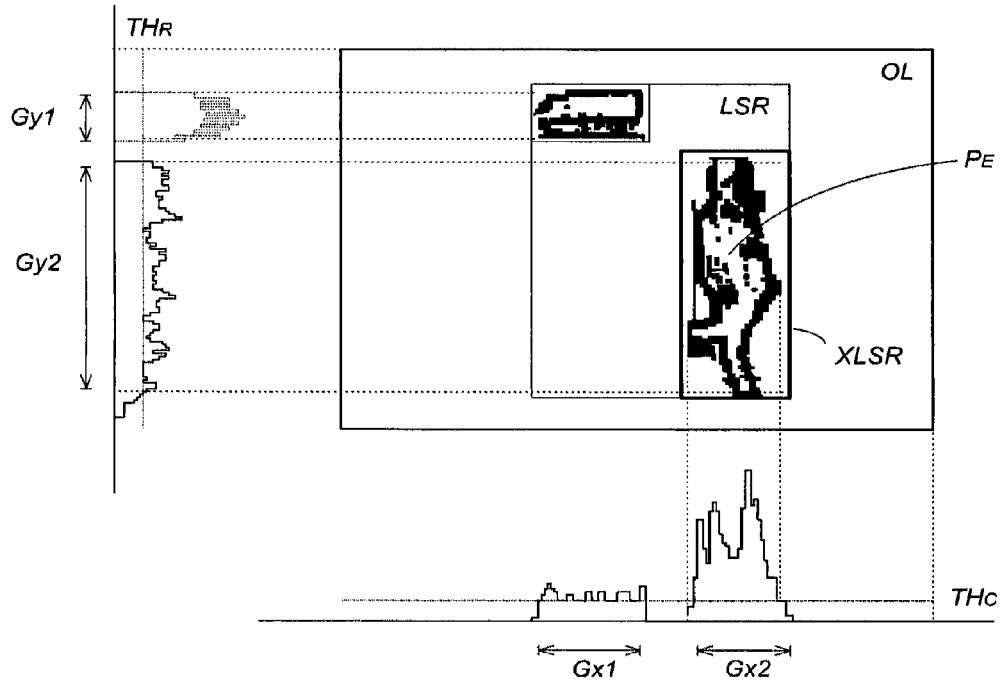

In case when two or more groups of the consecutive rows are selected as having the row index greater than the row threshold $TH_R$, or two or more groups of the consecutive columns are selected as having the column index greater than the column threshold $TH_C$, as shown in FIGS. 17 and 18, the position estimating means validates only one set of groups (Gy2, Gx2) closer to the estimated position $P_E$, and therefore restrict the limited search region to the region XLSR defined by the validated groups.

Further, in order to reduce the number of the calculations when restricting the limited search region LSR further to XLSR in a situation where two or more groups of the consecutive rows or columns are possible in the limited search region LSR, the position estimating means 76 may be configured to first obtain one of the row index and the column index, and remove unnecessary calculations for obtaining the other one of the row index and the column index based upon the analysis of the one of the row index and the column index. For easy understanding, FIG. 17 is first referred to explain a project of calculating the row index prior to calculating the column index. After obtaining the row index for each of the rows within the confine of the limited search region LSR, the position estimating means 76 selects two groups Gy1 and Gy2 of the consecutive rows each having the row index greater than the row threshold $TH_R$, and validates only one group Gy2 which is closer to the estimated position $P_E$ than the other group Gy1. Subsequently, the position estimating means 76 obtains the column index only within a range confined by the validates group Gy2, selects a group Gx2 of the consecutive columns each having the column index greater than the column threshold $TH_C$, and delimit the limited search region further to a regions XLSR confined by the selected group Gx2 of the consecutive columns and the validated group Gy2 of the consecutive rows.

Alternatively, as shown in FIG. 18, the limited search region LSR may be first analyzed with regard to the column index so as to validate one of the groups Gx1 and Gx1 of the consecutive columns. After the group Gx2 of the consecutive columns is validated as being closer to the estimated position $P_E$ than the other group Gx1, a calculation is made to obtain the row index only within a range confined by the validated group Gx2 of the consecutive columns and to select the group Gy2 of consecutive rows each having the row index greater than the row threshold $TH_R$. Then, the position estimating means 76 restricts the limited search region LSR further to a region XLSR confined by thus selected group Gy2 of the consecutive rows and the validated group Gx2 of the consecutive columns.

In the above arrangements explained with reference to FIGS. 17 and 18, the terms "consecutive rows" or "consecutive columns" is not to be interpreted in a strict sense in the present invention but is defined as a series of rows or columns in which the rows or columns having the row or column index below the threshold are not continuous over a predetermined number, admitting a transient interposition of the row or column having the row or column index below the threshold in order to eliminate possible noise or errors for accurate detection of the moving object.

Although the above description discloses and explains various features only exemplarily for easy understanding of the basic concept of the present invention, it should be noted here that any combination of the features are also within the scope of the present invention.

The invention claimed is:

1. A target moving object tracking device comprising:
a picture image memory configured to store a time series of real picture images taken by a video camera with regard to an inspection zone covering a possible target moving object;
a display configured to display selective one or ones of said real picture images at a desired magnification;
an outline image processor configured to provide outline images respectively from said real picture images;
a template memory configured to store a template image identifying said target moving object;
a moving object locator configured to compare each one of said outline images with said template image to detect a partial area of each outline image that matches with the template image, said moving object locator obtaining positional data of the target moving object within the inspection zone based upon the partial area detected to be in match with said template image;
enlarged picture generation means configured to extract, based upon said positional data, an enlarged image from a portion of said real picture image corresponding to the partial area of said outline image detected to match with the template image, and to display the enlarged picture image on said display;
wherein
said moving object locator is configured to extract a moving object outline image from each of said outline images in correspondence to said partial area detected to be in match with said template image,
template updating means is provided to update said template image by replacing it with a combination of a current one of said moving object outline images with previous one or ones of said moving object outline image,
wherein
said moving object locator comprises matching means which is configured to collect different partial areas out of said outline image, each areas being of the same size of said template image, to calculate a correlation with regard to each of said different areas, and to determine the partial area having a maximum correlation as said moving object outline image in match with said template image, and
said template updating means is configured to obtain a pixel value for each of pixels in said moving object outline image so as to add the pixel value to each corresponding one of the pixels in the previous moving outline image, and
wherein
said outline image processor is configured to give the outline image of binary data in which the pixel value of "1" is assigned to the pixels constituting an outline of the outline image and the pixel value of "0" is assigned to the remainder pixels of the outline image,
said matching means is configured to select the pixels from said template image corresponding to the pixels constituting the outline within each of said partial areas of said outline image, and obtain a number of the pixels having a pixel value of greater than "0" around each of the selected pixels so as to weight the pixel value for each of the selected pixels in accordance with thus obtained number of the pixels, said matching means being configured to define said correlation as the sum of thus weighted pixel values of the selected pixels of the template image.

2. A target moving object tracking device as set forth in claim 1, wherein
said outline image processor is configured to provide said outline image defined by binary data.

3. A target moving object tracking device as set forth in claim 2, wherein
said outline image processor is configured to provide a variable threshold for converting the real picture image into said outline image of the binary data,
said outline image processor being configured to obtain an average gray scale value of said template image, and lower the threshold as said average gray scale value is lower than a predetermined limit.

4. A target moving object tracking device as set forth in claim 1, further including:
a moving object outline image memory is provided to store a time series of the moving object outline images,
said template updating means is configured to read from said moving object outline image memory a predetermined number of the previous moving object outline images, combine these outline images with the current moving object outline image, and update the previous template image by replacing it with said combination.

5. A moving object tracking device as set forth in claim 4, wherein
said template updating means is configured to update said template image each time a fresh consecutive set of said moving object outline images are accumulated up to the predetermined number.

6. A target moving object tracking device as set forth in claim 4 or 5, wherein
said template updating means is configured to combine only the moving object outline image which is determined to be valid in accordance with a predetermined criterion.

7. A target moving object tracking device as set forth in claim 6, wherein
said template updating means is configured to calculate a pixel index which is a number of pixels that are included in each of the moving object outline images and have a pixel value of more than zero, and provide said criterion which determines the current moving object outline image as valid when the pixel index of the current moving object outline image varies from that of the previous moving object outline image by more than a predetermined extent.

8. A target moving object tracking device as set forth in claim 6, wherein
said template updating means is configured to calculate a standard deviation of the pixel value of one of the current moving object outline image and the corresponding real picture image, and to provide said criterion which determines the current moving object outline image as valid when said standard deviation varies by more than a predetermined extent from the standard deviation calculated with regard to the previous moving outline object image.

9. A target moving object tracking device as set forth in claim 6, wherein
said template updating means is configured to calculate the number of pixels constituting an outline of said moving object in each of said moving object outline images, and to provide said criterion which determines the current moving object outline image as valid when said number of the pixels with regard to the current moving object outline image varies by more than a predetermined extent from the number of the pixels with regard to the previous moving object outline image.

10. A target moving object tracking device as set forth in claim 1, further including:
   position estimating means for estimating a limited search region within said outline image for detection of the target moving object, and
   moving object extracting means configured to detect at least one possible moving object based upon a time-dependent difference between two or more of said consecutive outline images and provide at least one mask section of reduced size covering said moving object;
   said position estimating means being configured to obtain a time series data of said positional data which is stored in a position data memory each time said moving object locator gives the positional data, to calculate an estimated position of the target moving object based upon two or more consecutive time series data of said positional data, to set a prospected zone of a predetermined size around said estimated position, and to provide said limited search region which is a minimum region including said at least one said mask section which overlaps said prospected zone,
   said moving object locator being configured to select said partial areas only within said limited search region.

11. A target moving object tracking device as set forth in claim 10, wherein
   said position estimating means is configured to calculate an estimated moving speed of the moving object based upon two or more consecutive time series data of said positional data, and to provide said prospected zone of which size is proportional to said estimated speed of the moving object.

12. A target moving object tracking device as set forth in claim 10, wherein
   said position estimating means is configured to determine the size of said prospected zone which is a function of the size of said template image.

13. A target moving object tracking device as set forth in claim 11 or 12, wherein
   said position estimating means is configured to
   obtain a row index which is the number of the pixels arranged along each row of said limited search region and having the pixel value of "1" or greater,
   select a group of consecutive rows each having the row index greater than a predetermined row threshold,
   obtain a column index which is the number of the pixels arranged along each column of said limited search region and having the pixel value of "1" or greater,
   select a group of consecutive columns each having the column index greater than a predetermined column threshold, and
   further delimit said limited search region to a region confined by the selected group of the consecutive rows and the selected group of the consecutive columns.

14. A target moving object tracking device as set forth in claim 13, wherein
   said position estimating means is configured to validate, when two or more groups of the consecutive rows are selected, only one of said groups which is closer to said estimated position of the target moving object, and to validate, when two or more groups of the consecutive columns are selected, only one of said group which is closer to said estimated position of the target moving object.

15. A target moving object tracking device as set forth in claim 11 or 12, wherein
   said position estimating means is configured to
   obtain a row index which is the number of the pixels arranged along each row of said limited search region and having the pixel value of "1" or greater,
   select at least one group of consecutive rows each having the row index greater than a predetermined row threshold,
   validate only one group of the consecutive rows which is closer to said estimated position of the target moving object, when two or more groups of the consecutive rows are selected,
   obtain a column index which is the number of the pixels arranged along each row of said limited search region only within a range confined by said validated group of the consecutive rows and having the pixel value of "1" or greater,
   select a group of consecutive columns each having the column index greater than a predetermined column threshold, and
   further delimit said limited search region to a region confined by the selected group of the consecutive columns and said validated group of the consecutive rows.

16. A target moving object tracking device as set forth in claim 11 or 12, wherein
   said position estimating means is configured to
   obtain a column index which is the number of the pixels arranged along each column of said limited search region and having the pixel value of "1" or greater,
   select at least one group of consecutive columns each having the column index greater than a predetermined column threshold,
   validate only one group of the consecutive columns which is closer to said estimated position of the target moving object, when two or more groups of the consecutive columns are selected,
   obtain a row index which is the number of the pixels arranged along each row of said limited search region only within a range confined by said validated group of the consecutive columns and having the pixel value of "1" or greater,
   select a group of consecutive rows each having the row index greater than a predetermined row threshold, and
   further delimit said limited search region to a region confined by the selected group of the consecutive rows and the validated group of the consecutive columns.

17. A target moving object tracking device comprising:
   a picture image memory configured to store a time series of real picture images taken by a video camera with regard to an inspection zone covering a possible target moving object;
   a display configured to display selective one or ones of said real picture images at a desired magnification;
   an outline image processor configured to provide outline images respectively from said real picture images;
   a template memory configured to store a template image identifying said target moving object;
   a moving object locator configured to compare each one of said outline images with said template image to detect a partial area of each outline image that matches with the template image, said moving object locator obtaining positional data of the target moving object within the inspection zone based upon the partial area detected to be in match with said template image;
   enlarged picture generation means configured to extract, based upon said positional data an enlarged image from a portion of said real picture image corresponding to the partial area of said outline image detected to match with the template image, and to display the enlarged picture image on said display;
wherein
said moving object locator is configured to extract a moving object outline image from each of said outline images in correspondence to said partial area detected to be in match with said template image,
template updating means is provided to update said template image by replacing it with a combination of a current one of said moving object outline images with previous one or ones of said moving object outline image, and
wherein said outline image processor is configured to obtain a contrast of said template image so as to provide said outline image defined by binary data when said contrast exceeds a predetermined reference, and provide said outline image defined by gray scale data when said contrast is lower than said reference.

18. A target moving object tracking device as set forth in claim 17, wherein said outline image processor is configured to detect an average pixel value which is an average of pixel values given respectively to pixels within each of a plurality of divisions of said template image, and to judge that said contrast is below said reference when any one of said divisions is detected to have said average pixel value lower than a threshold or when said average pixel value detected for any one of said divisions is lower than that for another of said divisions by more than a predetermined extent.

* * * * *